US011239932B2

(12) United States Patent
Annavajjala et al.

(10) Patent No.: US 11,239,932 B2
(45) Date of Patent: Feb. 1, 2022

(54) CIRCUIT EMULATION MAINTAINING TRANSPORT OVERHEAD INTEGRITY

(71) Applicant: Cisco Technology, Inc., San Jose, CA (US)

(72) Inventors: Raghunandan Annavajjala, Bangalore (IN); Anand B. Agarwal, Bangalore (IN); Onkar R. Deshpande, Bangalore (IN); Christian Schmutzer, Koenigsbrunn Im Weinviertel (AT)

(73) Assignee: Cisco Technology, Inc., San Jose, CA (US)

( * ) Notice: Subject to any disclaimer, the term of this patent is extended or adjusted under 35 U.S.C. 154(b) by 93 days.

(21) Appl. No.: 16/230,849

(22) Filed: Dec. 21, 2018

(65) Prior Publication Data

US 2020/0153525 A1 May 14, 2020

(30) Foreign Application Priority Data

Nov. 14, 2018 (IN) .............................. 201841042724

(51) Int. Cl.
*H04J 3/06* (2006.01)
*H04J 3/16* (2006.01)
*H04J 3/14* (2006.01)

(52) U.S. Cl.
CPC .......... *H04J 3/0623* (2013.01); *H04J 3/0658* (2013.01); *H04J 3/14* (2013.01); *H04J 3/167* (2013.01); *H04J 3/1611* (2013.01)

(58) Field of Classification Search
CPC ........ H04J 3/0623; H04J 3/167; H04J 3/1611; H04J 3/14; H04J 3/0658; H04J 2203/0057; H04J 3/0632; H04L 41/0813
See application file for complete search history.

(56) References Cited

U.S. PATENT DOCUMENTS

| 7,656,791 B1* | 2/2010 | Mok ......................... H04J 3/14 370/225 |
| 2002/0015411 A1* | 2/2002 | Kataoka ............. H04Q 11/0478 370/395.6 |
| 2002/0131408 A1* | 9/2002 | Hsu ........................ H04J 3/1611 370/355 |

(Continued)

OTHER PUBLICATIONS

G. Manhoudt et al., "Transparent SDH/SONET over Packet draft-manhoudt-pwe3-tsop-08," Internet Draft, Expires Jul. 21, 2016, 40 pages.

(Continued)

*Primary Examiner* — Gregory B Sefcheck
*Assistant Examiner* — Joshua Smith
(74) *Attorney, Agent, or Firm* — Patterson + Shendan, LLP

(57) ABSTRACT

Techniques for emulating a time division multiplexed (TDM) circuit using a packet switched network are described. First and second packet nodes are installed in a communication network. The first TDM node and second TDM node form a first span in the TDM circuit. First and second fiber connections are disconnected from the first and second TDM nodes, and connected to the first and second packet nodes. A portion of TDM data transmission across the first span is emulated using a packet connection formed by the first packet node and the second packet node. The TDM data transmission includes transport overhead data, and the packet connection emulates the transport overhead data.

18 Claims, 12 Drawing Sheets

(56) References Cited

U.S. PATENT DOCUMENTS

| | | | | |
|---|---|---|---|---|
| 2003/0031126 A1* | 2/2003 | Mayweather | ......... | H04L 12/437 370/223 |
| 2009/0016366 A1* | 1/2009 | Endo | ....................... | H04L 45/00 370/401 |
| 2009/0323521 A1* | 12/2009 | Tochio | .................... | H04L 12/42 370/225 |
| 2010/0303464 A1* | 12/2010 | Dong | .................... | H04J 3/1652 398/98 |
| 2013/0010683 A1* | 1/2013 | Kishita | ............... | H04L 12/4633 370/315 |
| 2013/0230326 A1* | 9/2013 | Hu | ........................ | H04J 3/1652 398/67 |
| 2014/0050078 A1* | 2/2014 | Sato | .................... | H04L 41/0654 370/228 |
| 2014/0204923 A1* | 7/2014 | Ayadurai | .............. | H04W 88/10 370/337 |

OTHER PUBLICATIONS

"Transparent SONET or SDH over Packet (TSoP) Protocol," Information About TSoP Smart SFP, 8 pages.

* cited by examiner

CIRCUIT EMULATION MAINTAINING TRANSPORT OVERHEAD INTEGRITY

TECHNICAL FIELD

Aspects of the present disclosure relate to communication networks, and more specifically, though not exclusively, to circuit emulation techniques for time division multiplexed networks.

BACKGROUND

Circuit emulation technology is becoming popular for network operators as a way to migrate away from legacy synchronous optical networking (SONET) and synchronous digital hierarchy (SDH) networks to packet switched networks. For example, network operators can emulate circuit switched time-division multiplexing (TDM) networks, like SONET and SDH networks, using various packetization techniques. These techniques can include structure-agnostic time division multiplexing over packet (SAToP), structure-aware time division multiplexed circuit emulation service over packet switched network (CESoPSN), and circuit emulation over packet (CEP).

One challenge for network operators, however, is completing this migration efficiently and effectively. It is often not possible to convert a SONET or SDH network all at once to a packet switched network. Instead, new packet resources are rolled out over time. Further, a network operator may wish to migrate part, but not all, of a circuit switched network. One or more embodiments described herein relate to techniques to allow migration of various TDM services, one by one, while keeping operation of the legacy SONET or SDH network infrastructure intact.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1A:
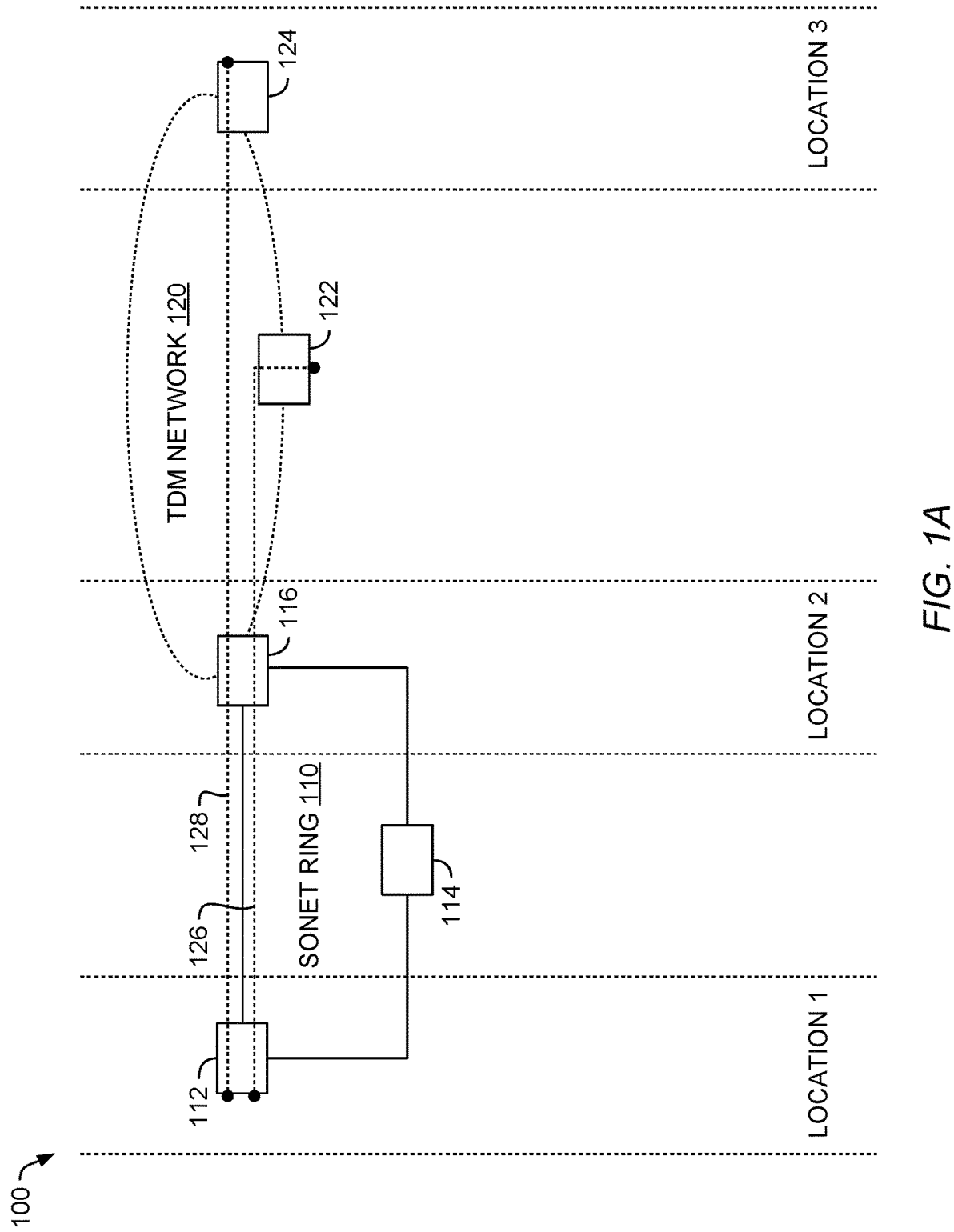
FIGS. 1A-B illustrate a legacy synchronous optical networking network and a corresponding migrated packet network, according to one embodiment described herein.

Embodiments described herein include a method for emulating a time division multiplexed (TDM) circuit using a packet switched network. The method includes installing a first packet node and a second packet node in a communication network including a first TDM node and a second TDM node, the first TDM node and the second TDM node forming a first span in the TDM circuit. The method further includes disconnecting a first fiber connection from the first TDM node and connecting the first fiber connection to the first packet node. The method further includes disconnecting a second fiber connection from the second TDM node and connecting the second fiber connection to the second packet node. The method further includes emulating a portion of TDM data transmission across the first span using a packet connection formed by the first packet node and the second packet node. The TDM data transmission includes transport overhead data, and the packet connection emulates the transport overhead data Embodiments described herein further include a system. The system includes a first packet node and a second packet node communicatively coupled to form a packet connection in a packet switched network. The system further includes a first time division multiplexed (TDM) node and a second TDM node communicatively coupled to form a first span in a TDM circuit. The system further includes a third TDM node and a fourth TDM node communicatively coupled to form a second span in the TDM circuit. The packet connection is configured to emulate a portion of TDM data transmission across the first span, the TDM data transmission includes transport overhead data, and the packet connection emulates the transport overhead data, and Embodiments described herein further include a packet node in a communication network. The packet node includes a network connection that communicatively couples the packet node to a second packet node and forms a packet connection in the communication network. The communication network includes a first time division multiplexed (TDM) node and a second TDM node communicatively coupled to form a first span in a TDM circuit. The communication network further includes a third TDM node and a fourth TDM node communicatively coupled to form a second span in the TDM circuit. The packet connection is configured to emulate a portion of TDM data transmission across the first span, the TDM data transmission includes transport overhead data, and the packet connection emulates the transport overhead data. The second span in the TDM circuit is operable to transport data using TDM while the packet connection is configured to emulate the portion of TDM data transmission across the first span.

Example Embodiments

Synchronous optical networking (SONET) and synchronous digital hierarchy (SDH) are protocols for transferring multiple digital bit streams synchronously over optical fiber using lasers or other light sources. SONET is often uses in the United States and Canada, while SDH is often used in the rest of the world. The disclosure herein will focus on SONET, but these techniques are equally applicable to SDH.

SONET typically includes dedicated data communication channels (DCCs) and other data (e.g., K1 and K2 bytes) as part of transport overhead data (TOH). This TOH facilitates path protection, inband management, and other network management functions. These functions can be managed by a network management system (NMS). The TOH can facilitate an inband management connection between SONET devices and NMS systems. Further, in some circumstances, the TOH can be used to represent the physical topology of the SONET network to circuit routing logic for path computation.

Therefore, when emulating a SONET network using a packet network, it is desirable to emulate the TOH as well as the data being transported. One technique to do this is to emulate the whole SONET interface. But this can be extremely bandwidth intensive and wasteful. For example, emulating a complete SONET interface could require approximately 11 Gbps of packet bandwidth. This is inefficient, and rules out migrating a SONET network using 10 Gbps packet network links.

Circuit emulation over packet (CEP) technology allows a packet network to emulate only paths (i.e., time slots) that are actually in use to carry user data for the SONET time division multiplexed (TDM) connections and services. For example, CEP techniques allow the emulation of a particular synchronous transport signal (STS) within the SONET frame—for example, only the STS actually in use. Emulation of a particular STS can be done with approximately 50 Mbps of packet bandwidth, making this much more efficient than emulating the whole SONET interface. Further, CEP techniques can be used to emulate particular virtual tributaries (VTs) within an STS payload. A given VT can be emulated with as little as 2 Mbps of packet bandwidth, making this even more efficient.

But in traditional CEP techniques, the TOH data is lost. The TOH data is terminated by the packet system and not carried over to the corresponding TDM node (e.g., an add-drop multiplexer (ADM)). One or more techniques disclosed herein describe use of a circuit emulation connection to carry the TOH and solve this problem. This allows for TOH transparency, allowing the NMS to carry on with the various network management functions facilitated by the TOH data, with the bandwidth efficiency of CEP techniques.

FIG. 1A illustrates a legacy SONET network, according to one embodiment described herein. A network 100 includes a SONET ring 110 that is connected to a TDM network 120. The SONET ring 110 includes the SONET nodes 112, 114, and 116. In the illustrated embodiment, the SONET node 112 is located in physical location 1, the SONET node 116 is located in physical location 2, and the SONET node 114 is located between the SONET nodes 112 and 116. As discussed above, the illustrated disclosure focuses on SONET and FIG. 1A illustrates a SONET ring 110, but the techniques disclosed are equally applicable to an SDH ring.

The TDM network 120 includes the TDM circuits 122 and 124. In an embodiment, the TDM circuit 124 is located in physical location 3. In an embodiment, data can travel from the SONET node 112 to the TDM circuit 124 via the path 128. Further, data can travel from the SONET node 112 to the TDM circuit 122 via the path 126.

Figure 1B:
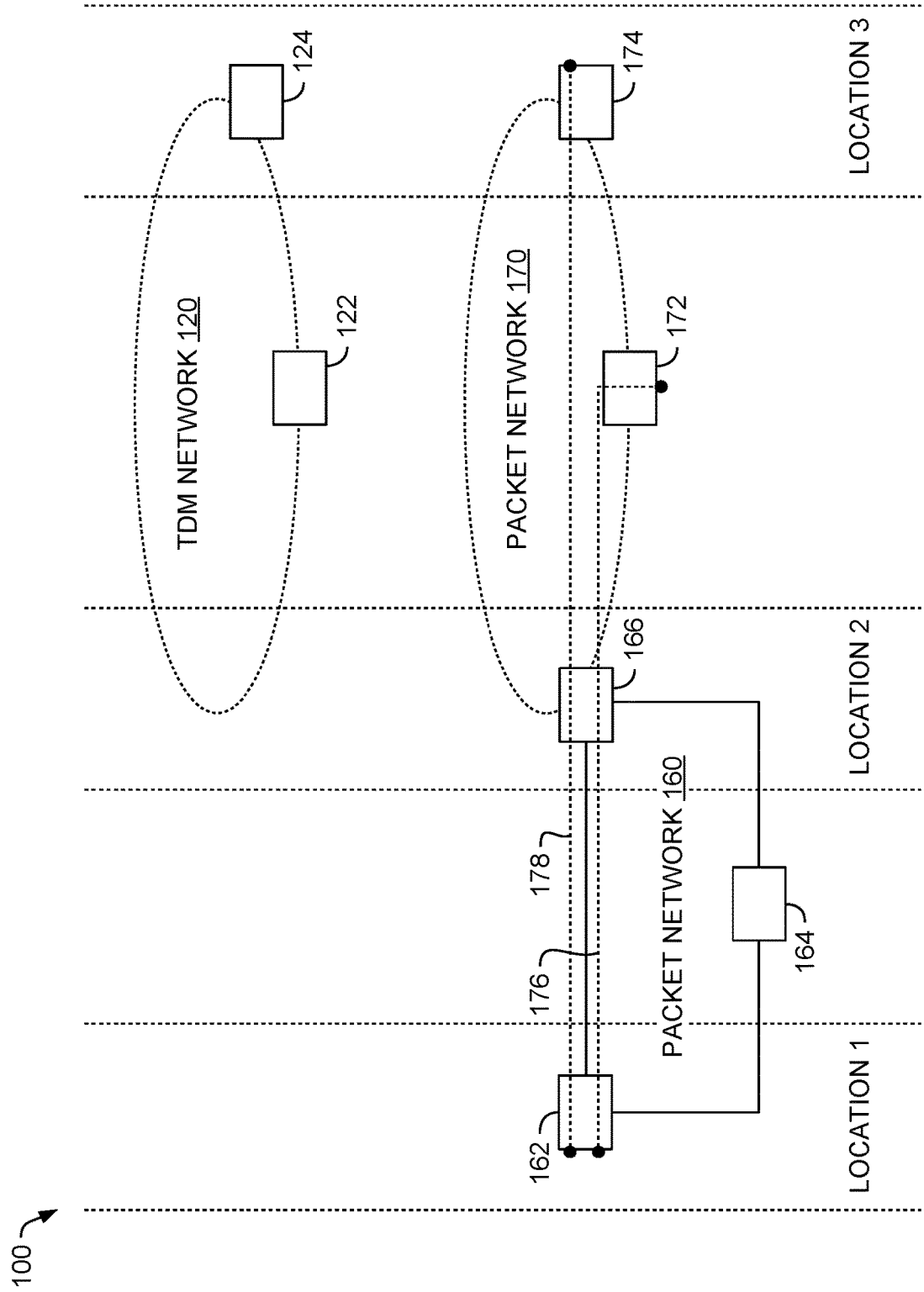

FIG. 1B illustrates a packet network emulating the legacy SONET network of FIG. 1A, according to one embodiment described herein. In an embodiment, FIG. 1B corresponds to the end result after migration of the SONET network in FIG. 1A to a packet network. The network 100 includes a packet switched network 160 (e.g., an Ethernet network) and a packet switched network 170. The packet network 160 includes the packet nodes 162, 164, and 166. In an embodiment, the packet node 162 (e.g., an Ethernet node) is located at physical location 1, the same physical location as the SONET node 112. In an embodiment, the packet node 166 is located at physical location 2, the same physical location as the SONET node 116. The packet node 164 is located at the same physical location as the SONET node 114. Alternatively, the packet nodes 162, 164, and 166 are located in different physical locations from the SONET nodes 112, 114, and 116.

The packet network 170 includes emulated TDM circuits 172 and 174. In an embodiment, the emulated TDM circuit 172 is located at the same physical location as the TDM circuit 122, and is used to emulate the TDM circuit 122. Further, in an embodiment, the emulated TDM circuit 174 is located at the same physical location as the TDM circuit 124 and is used to emulate the TDM circuit 124. In an embodiment, the packet network 160 and the packet network 170 are used in place of the SONET ring 110 and the TDM network 120. Data travels from the packet node 162 to the emulated TDM circuit 172 via the path 176, while data travels from the packet node 162 to the emulated TDM circuit 174 via the path 178.

Figure 2:
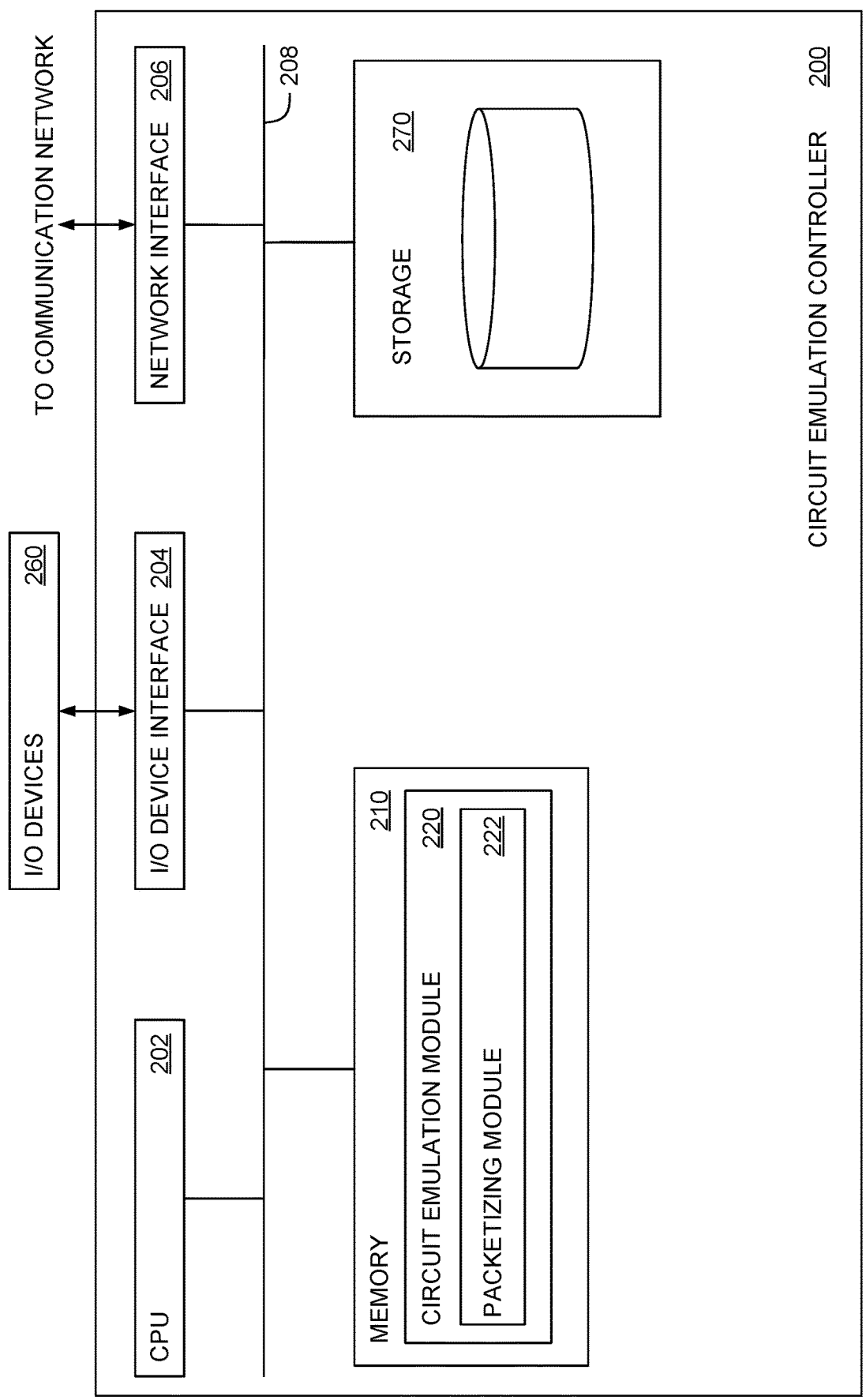
FIG. 2 illustrates a circuit emulation controller, according to one embodiment described herein.

FIG. 2 illustrates a circuit emulation controller 200, according to one embodiment described herein. As shown, the circuit emulation controller 200 includes, without limitation, a central processing unit (CPU) 202, a network interface 206, a memory 210, and storage 270, each connected to a bus 208. In an embodiment, the circuit emulation controller 200 also includes an Input/Output (I/O) device interface 204 for connecting to I/O devices 260. In an embodiment, the I/O devices 260 can be external I/O devices (e.g., keyboard, display and mouse devices). Alternatively, the I/O devices 260 can be built in I/O devices (e.g., a touch screen display or touchpad). As another alternative, the circuit emulation controller 200 does not include its own I/O device interface 204 and is instead managed remotely using the network interface 206.

The CPU 202 retrieves and executes programming instructions stored in the memory 210 as well as stores and retrieves application data residing in the storage 270. The bus 208 is used to transmit programming instructions and application data between the CPU 202, the I/O device interface 204, the storage 270, the network interface 206, and the memory 210. The CPU 202 is included to be representative of a CPU, multiple CPUs, a single CPU having multiple processing cores, graphics processing units (GPUs) having multiple execution paths, and the like. The memory 210 is generally included to be representative of electronic storage of any suitable type(s), including random access memory or non-volatile storage. The storage 270 may be a disk drive storage device. Although shown as a single unit, the storage 270 may be a combination of fixed or removable storage devices, such as fixed disc drives, removable memory cards, network attached storage (NAS), or a storage area-network (SAN).

Although the memory 210 is shown as a single entity, the memory 210 may include one or more memory devices having blocks of memory associated with physical addresses, such as random access memory (RAM), read only memory (ROM), flash memory or other types of volatile and/or non-volatile memory. The memory 210 generally includes program code for performing various functions related to use of the circuit emulation controller 200. The program code is generally described as various functional "applications" or "modules" within the memory 210, although alternate implementations may have different functions and/or combinations of functions. Within the memory 210, the circuit emulation module 220 facilitates migration of a legacy synchronous optical networking network to a packet network, as described in relation to subsequent Figures. The circuit emulation module 220 further includes a packetizing module 222. The packetizing module 222 is generally configured to facilitate packetization of a SONET frame, as described in relation to FIGS. 3A-C, below.

In an embodiment, the circuit emulation controller 200 can be implemented as part of an packet node in the packet network (e.g., one or more of the packet nodes 162, 164, and 166 illustrated in FIG. 1B). Alternatively, the circuit emulation controller 200 can be implemented as a separate system in communication with the packet nodes. In one embodiment, the circuit emulation controller 200 is a single system. Alternatively, the circuit emulation controller 200 is distributed across multiple systems.

Figure 3A:
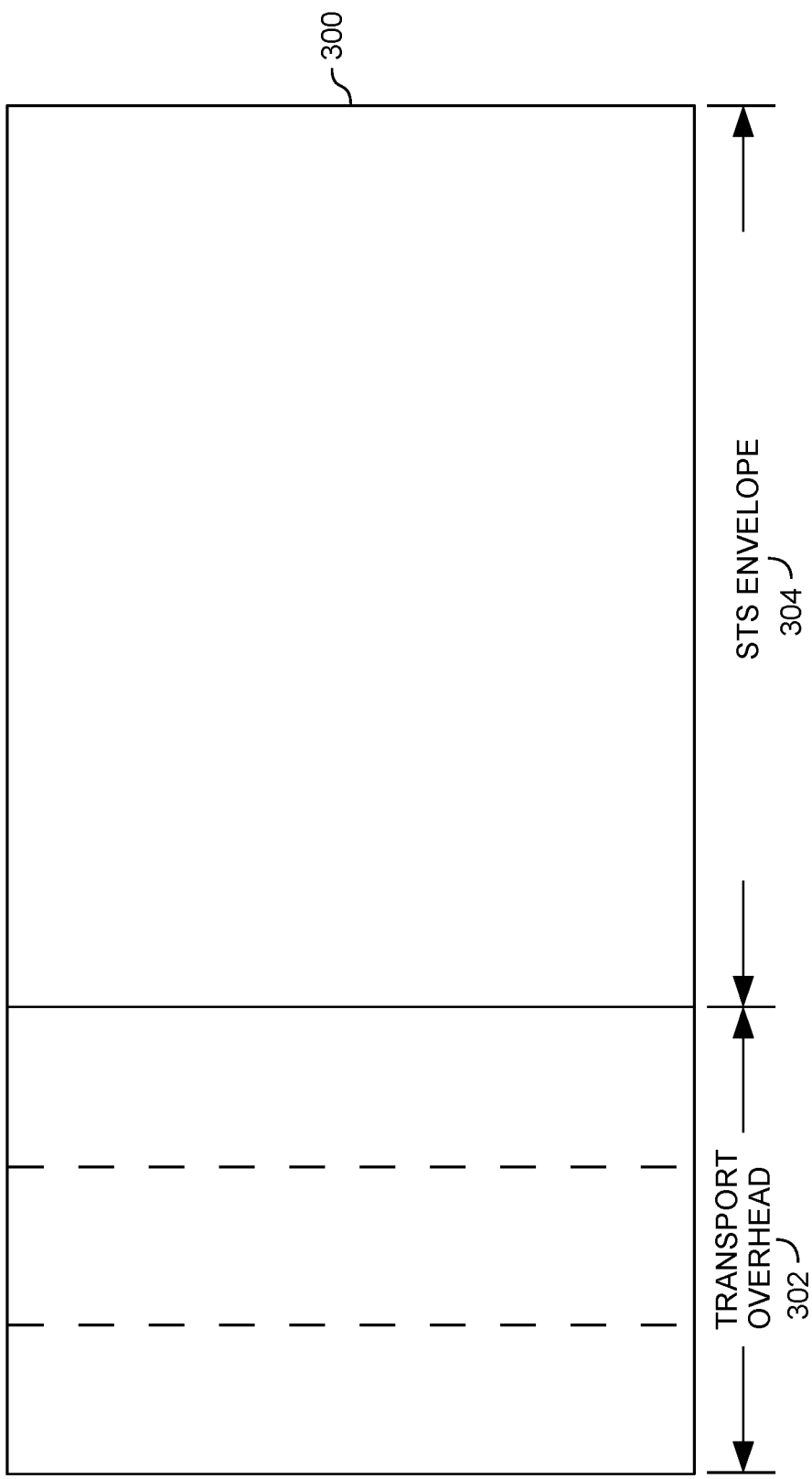
FIGS. 3A-C illustrate packetization of a SONET frame, according to one embodiment described herein.
Figure 3B:
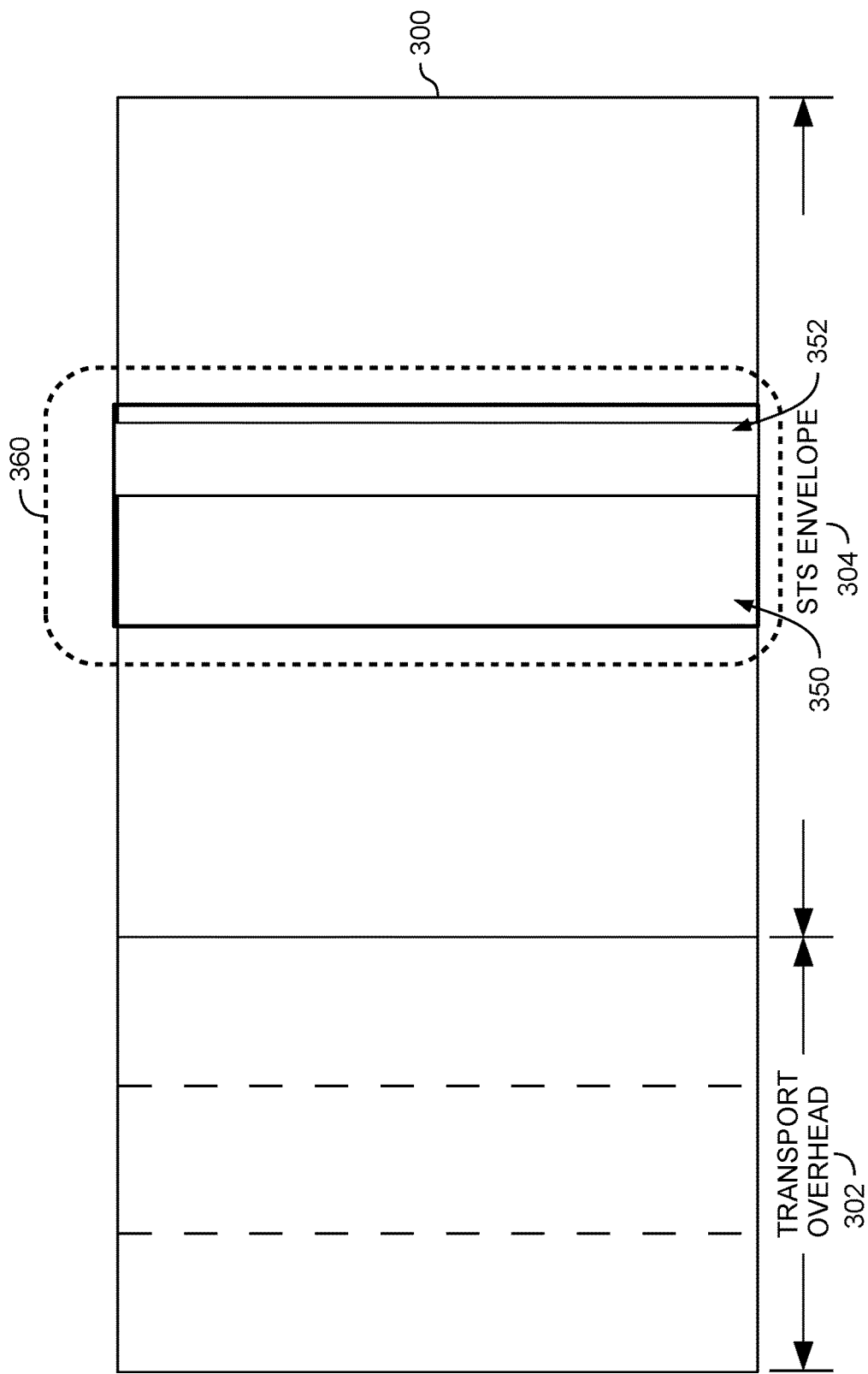
Figure 3C:
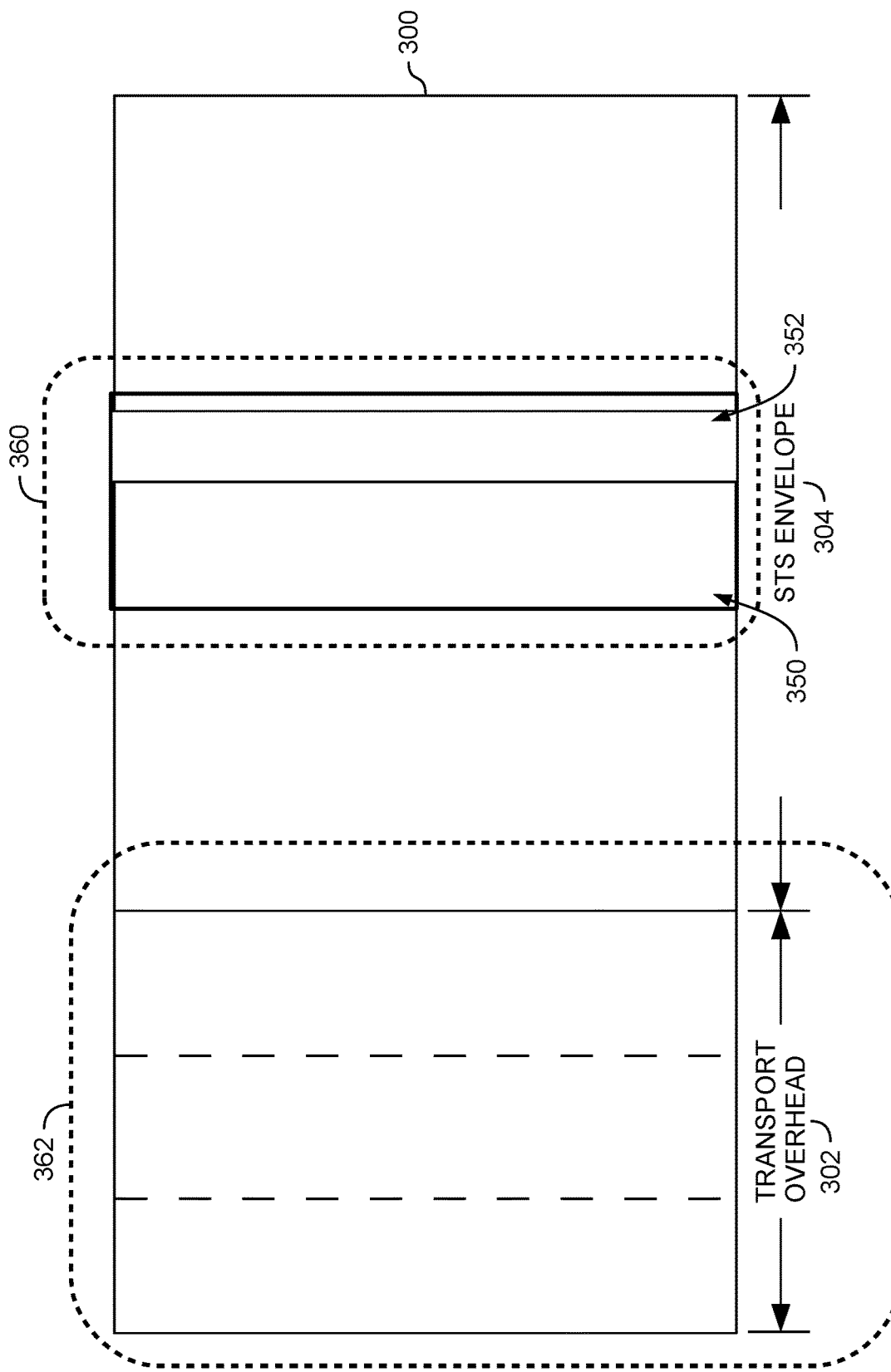

FIGS. 3A-C illustrate packetization of a SONET frame, according to one embodiment described herein. FIG. 3A illustrates a SONET frame 300. The SONET frame 300 includes a transport overhead 302 and an STS envelope 304. In an embodiment, the transport overhead 302 includes the DCC and other TOH data (e.g., K1 and K2 bytes). In an embodiment, the STS envelope 304 includes the user data for transmission.

FIG. 3B illustrates the SONET frame 300, with CEP packetization. In an embodiment, an STS 350 currently in use to carry user data is packetized, as illustrated with the boundary 360. The STS 350 includes several VTs, including the VT 352. The VT 352 is packetized as part of the packetization of the STS 350. In an embodiment, this packetization is done as part of standard CEP techniques.

FIG. 3C illustrates the SONET frame 300 with TOH packetization. As illustrated by the boundary 362, in addition to the STS 350 the transport overhead 302 is also packetized. In an embodiment, this is done using the techniques described in relation to FIG. 4. Alternatively, other packetization techniques can be used.

Figure 4:
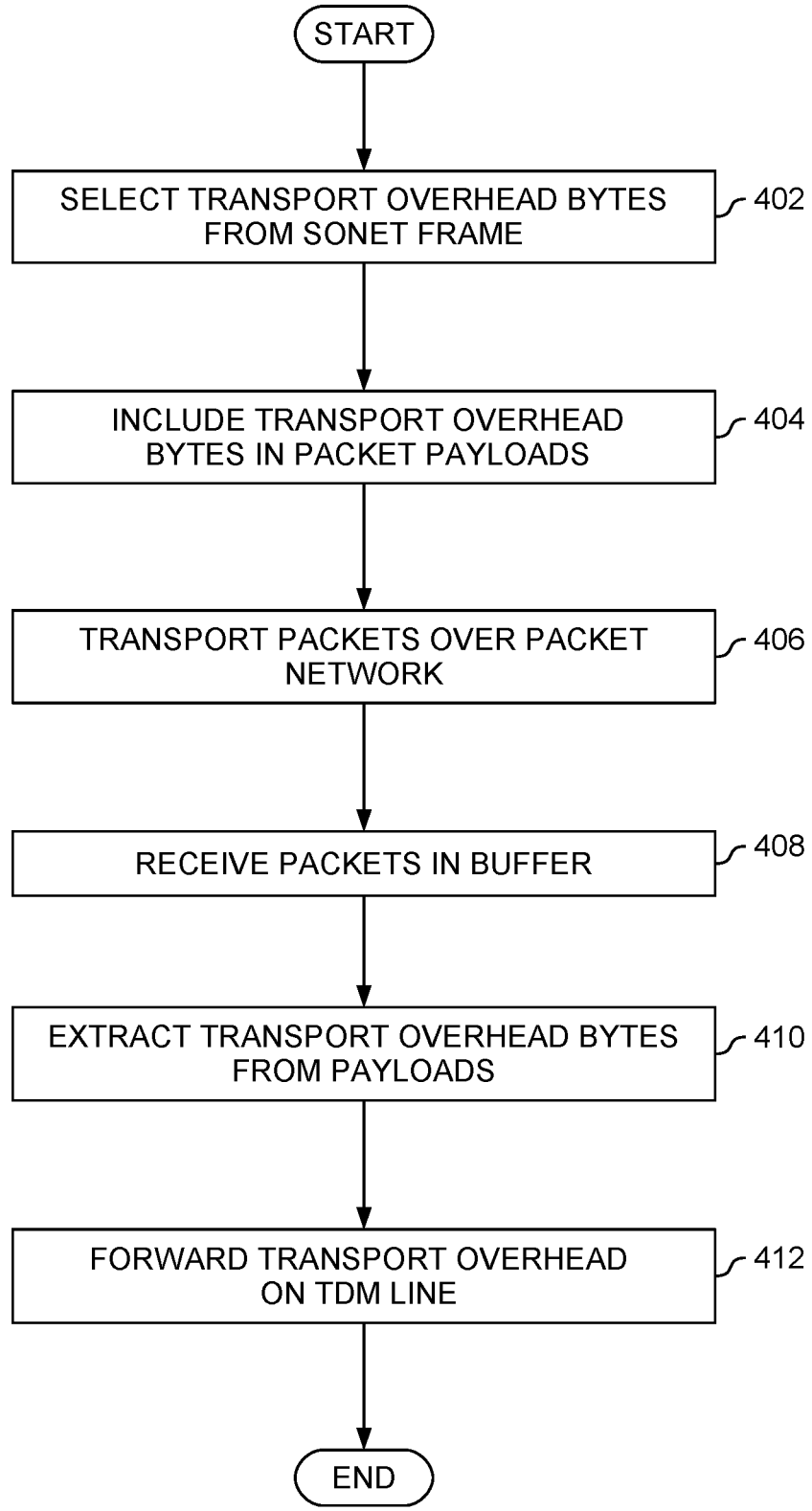
FIG. 4 is a flowchart illustrating packetization of a SONET frame, according to one embodiment described herein.

FIG. 4 is a flowchart illustrating packetization of a SONET frame, according to one embodiment described herein. In an embodiment, this corresponds to the SONET frame illustrated in FIG. 3C. At block 402, a packetization module (e.g., the packetization module 222 within the circuit emulation module 220 illustrated in FIG. 2) selects the transport overhead bytes from a SONET frame (e.g., the transport overhead 302 illustrated in FIGS. 3A-C). In an embodiment, the packetization module selects all the transport overhead bytes in the SONET frame. In an alternative embodiment, the packetization module selects a subset of the transport overhead bytes. For example, the packetization module can be configured to select only bytes that are used by the particular network being migrated. Alternatively, the packetization module can identify transport overhead bytes actually carrying data and select those bytes.

At block 404, the packetization module includes the transport overhead bytes in the payload of a packet (e.g., a packet carrying data). For example, in a multiprotocol label switching (MPLS) network, the packetization module includes the transport overhead bytes in the payload of an MPLS packet. Further, the packetization module assigns a sequence number to the transport overhead bytes. For example, the packetization module can spread the transport overhead bytes across multiple MPLS packets, and can assign the data in each packet a sequence number so that the data can be re-assembled when it is received.

In an embodiment, the packetization module includes the transport overhead in packets that are not carrying the SONET envelope data. In this embodiment, the packetization module includes the transport overhead in separate packets from the packets carrying the SONET envelope data. For example, the circuit emulation controller (e.g., the circuit emulation controller 200) can establish a pseudowire to carry packets containing the transport overhead, and can transmit a dedicated flow of packets (e.g., MPLS packets) carrying the transport overhead. Alternatively, the packetization module includes the transport overhead in packets carrying the SONET envelope data, or in any other suitable packets.

At block 406, the circuit emulation controller (e.g., the circuit emulation controller 200) transports the packet including the transport overhead bytes over the packet network to a destination that is in communication with the remaining TDM network. For example, in an MPLS network, the MPLS packets including the transport overhead bytes can be transmitted across the network using typical MPLS techniques. At block 408, the recipient node receives the packet and places it in a buffer (e.g., a de-jitter buffer or any other suitable buffer). As discussed above, in an embodiment the packet carrying the transport overhead bytes does not carry the SONET envelope data.

At block 410, a packetization module in communication with the recipient node extracts the transport overhead bytes from the packet payloads and re-assembles the transport overhead bytes. In an embodiment, the received bytes further include a sequence number (as discussed above), and the packetization module uses the sequence number to re-assemble the transport overhead bytes. At block 412, the circuit emulation controller forwards the transport overhead bytes across the TDM line. In an embodiment, the recipient node is communicatively coupled to the TDM circuit, and transports the TDM overhead bytes across the existing TDM line (e.g., paths 126 or 128 illustrated in FIG. 1A).

Figure 5:
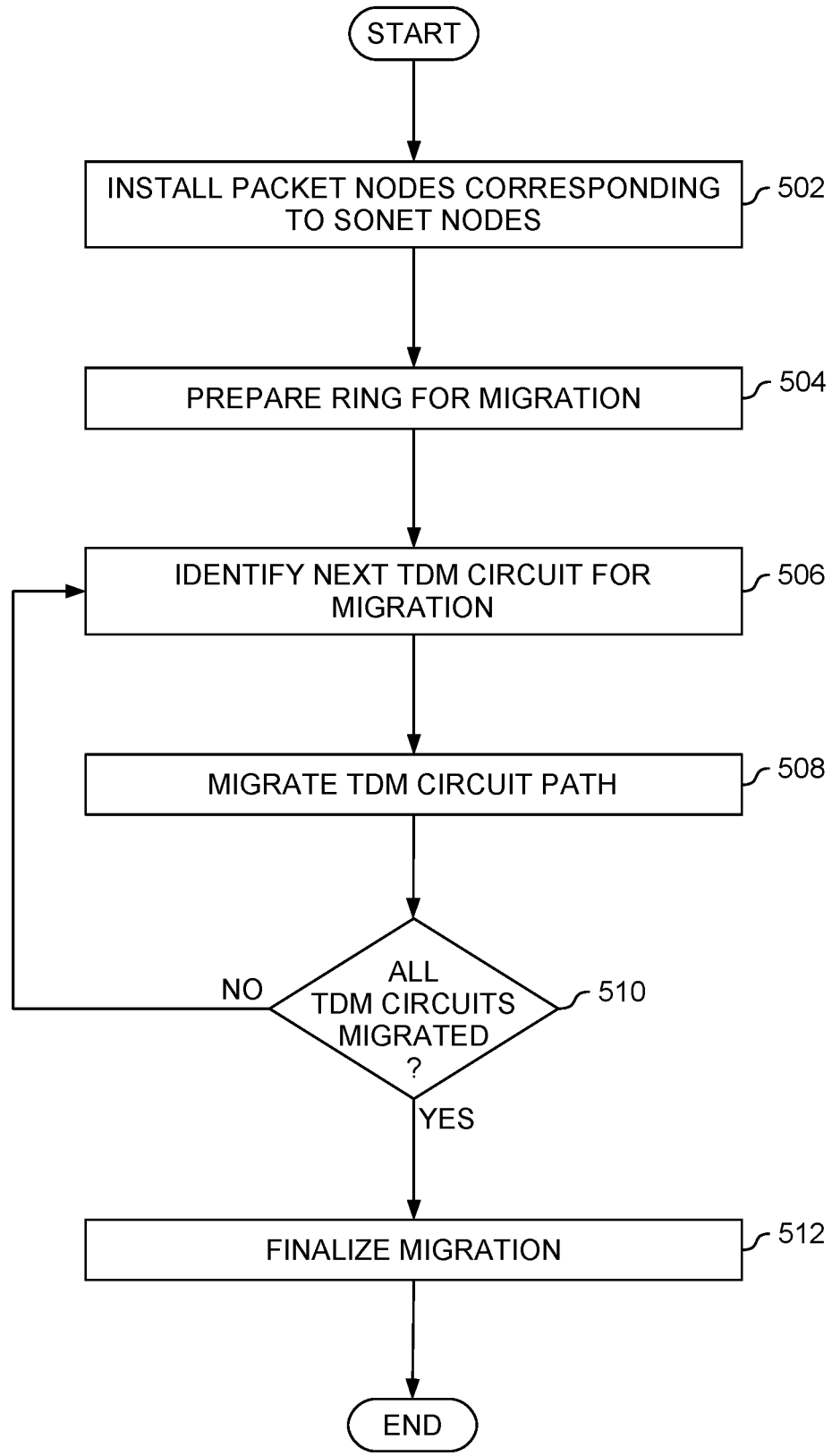
FIG. 5 is a flowchart illustrating migration of a legacy synchronous optical networking network to a packet network, according to one embodiment described herein.

FIG. 5 is a flowchart illustrating migration of a legacy synchronous optical networking network to a packet network, according to one embodiment described herein. FIGS. 6A-D illustrate migration of a legacy synchronous optical networking network to a packet network, according to one embodiment described herein. In an embodiment, the flowchart of FIG. 5 corresponds with the network configurations illustrated in FIGS. 6A-D. Consequently, FIGS. 5 and 6A-D will be discussed together.

Figure 6A:
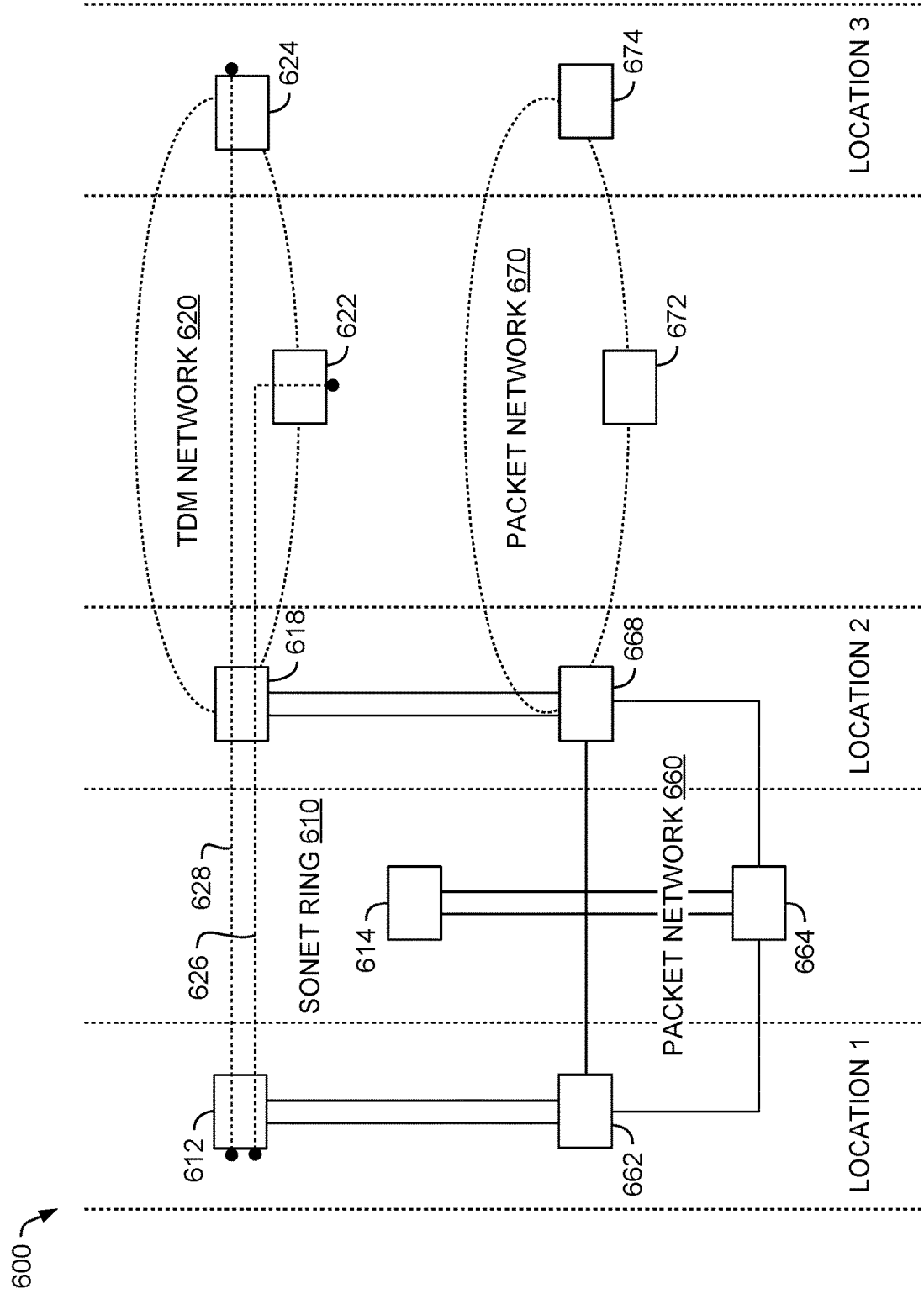
FIGS. 6A-D illustrate migration of a legacy synchronous optical networking network to a packet network, according to one embodiment described herein.

At block 502, a network administrator installs packet nodes adjacent to SONET nodes in the legacy network, so that the fiber connections to the SONET nodes can be transferred to the packet nodes. These packet nodes correspond to the SONET nodes. For example, as illustrated in FIG. 6A, a network 600 includes several SONET nodes 612, 614, and 618. At block 502, packet nodes are installed adjacent to these nodes and correspond to the SONET nodes 612, 614, and 618. For example, a packet node 662 is installed adjacent to the SONET node 612 and the packet node 662 corresponds to the SONET node 612, a packet node 664 is installed adjacent to the SONET node 614 and corresponds to the SONET node 614, and a packet node 668 is installed adjacent to the SONET node 618 and corresponds to the SONET node 618. In an embodiment, the network administrator also installs packet nodes adjacent to the TDM circuits (e.g., the TDM circuits 622 and 624). In an embodiment, the packet nodes are located physically adjacent to the corresponding SONET nodes (e.g., in the same physical location), and are directly connected. In an embodiment, a packet node is installed adjacent to a SONET node so that a fiber connection to the SONET node (e.g., a fiber connection to an add-drop multiplexer) can be transferred to the packet node, instead. Transferring the connection includes disconnecting the fiber connection from the SONET node and connecting the fiber connection to the packet node, instead. Alternatively, the packet nodes are located in a different physical location from the corresponding SONET nodes, but are connected to the SONET nodes, either directly or indirectly.

At block 504, a network administrator prepares the ring for migration. In an embodiment, the network administrator moves fibers from the SONET nodes (e.g., the add-drop multiplexers (ADMs)) in the SONET ring (e.g., the SONET ring 610) to the packet nodes. This is illustrated further in FIG. 6A, in which the packet network 660 is connected to emulate traffic through the SONET ring 610. The network 600 includes the SONET ring 610 that is connected to a TDM network 620, and the packet switched networks 660 (e.g., an Ethernet network) and 670. The packet nodes 662, 664, and 668 are connected using the fibers that were previously used to connect the SONET ADMs. While the fiber is moved the network administrator can avoid any impact on traffic by leveraging existing link protection techniques, for example unidirectional path-switched rings (UPSR) in a SONET network (or subnetwork connection protection (SNCP) in an SDH network). These link protection techniques provide for multiple redundant paths for traffic in the network, so that moving fibers one by one will not impact traffic.

In an embodiment, a circuit emulation controller (e.g., the circuit emulation controller 200 illustrated in FIG. 2) establishes circuit emulation connections between the packet nodes. For example, the circuit emulation controller establishes an emulated path between the packet nodes 662, 664, and 668, as illustrated in FIG. 6A. This path emulates both the TDM data and the transport overhead, as discussed above in relation to FIG. 4.

In an embodiment, the packet network 660 is an MPLS network, and label distribution protocol (LDP) techniques are used to establish pseudowire connections between the nodes in the packet network. In an embodiment, a pseudowire is a virtual connection between two packet devices used to emulate the SONET TDM connection. A given TDM timeslot or transport overhead component is selected to be part of a pseudowire connection. In an embodiment, the TDM timeslot or transport overhead component is selected by a system administrator, automatically, or using any other suitable technique. This selection is done at both ends of the connection (e.g., at the packet node 662 and the packet node 668 for a pseudowire connection between these nodes). Using LDP techniques, each node at the end of the pseudowire is provided with a virtual connection (VC) label to use with packets transported over the pseudo-wire between the nodes. That label is then used for routing the packet over the MPLS packet network. Further, the label can be used when de-packetizing the traffic to re-create the SONET frame and ensure the data is transported over the appropriate TDM connection.

Figure 6B:
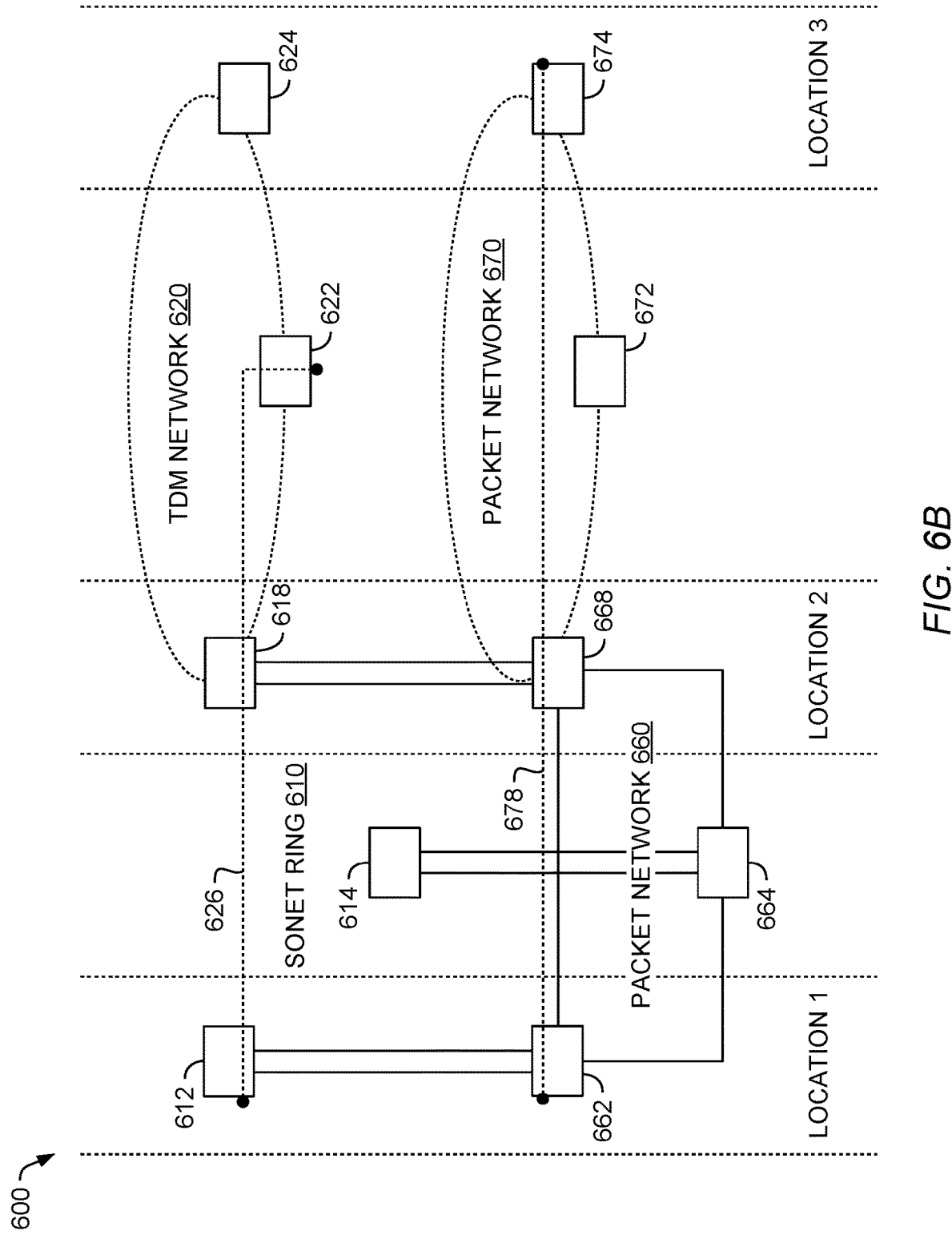

At block 506, a network administrator identifies the next TDM circuit for migration. For example, as illustrated in FIG. 6A, the next TDM circuit for migration is TDM circuit 624. At block 508, a network administrator migrates the identified TDM circuit path. As illustrated in FIG. 6A, the legacy network includes a path 628 from the SONET node 612 to the TDM circuit 624. The circuit emulation controller migrates this path to the packet network. As illustrated in FIG. 6B, new path 678 carries traffic from the packet node 662 to the emulated TDM circuit 674. This new path 678 in FIG. 6B replaces the legacy path 628 in FIG. 6A.

In an embodiment, the network administrator migrates the path 628 to the path 678 by moving customer facing TDM ports from the SONET ADM (e.g., the SONET node 612) to the packet nodes (e.g., the packet node 662). The network administrator then provisions a circuit emulation connection between the packet node (e.g., the packet node 662) and the emulated TDM circuit (e.g., the emulated TDM circuit 674). This can be done in a similar fashion to the techniques for migrating the SONET ring, discussed above in relation to block 504, and will not be repeated here. In an embodiment, after a TDM circuit is migrated (e.g., the TDM circuit 624), the respective circuit emulation connection associated with the packet network 660 can be removed. For example, as illustrated in FIG. 6B, the connection between the packet nodes 662, 664, and 668 can be removed.

Returning to FIG. 5, at block 510 the network administrator determines whether all TDM circuits have been migrated. In the network illustrated in FIG. 6B, they have not, so the flow returns to block 506. The network administrator identifies the next TDM circuit for migration. In this case, as illustrated in FIG. 6B, the TDM circuit 622 is next for migration.

Figure 6C:
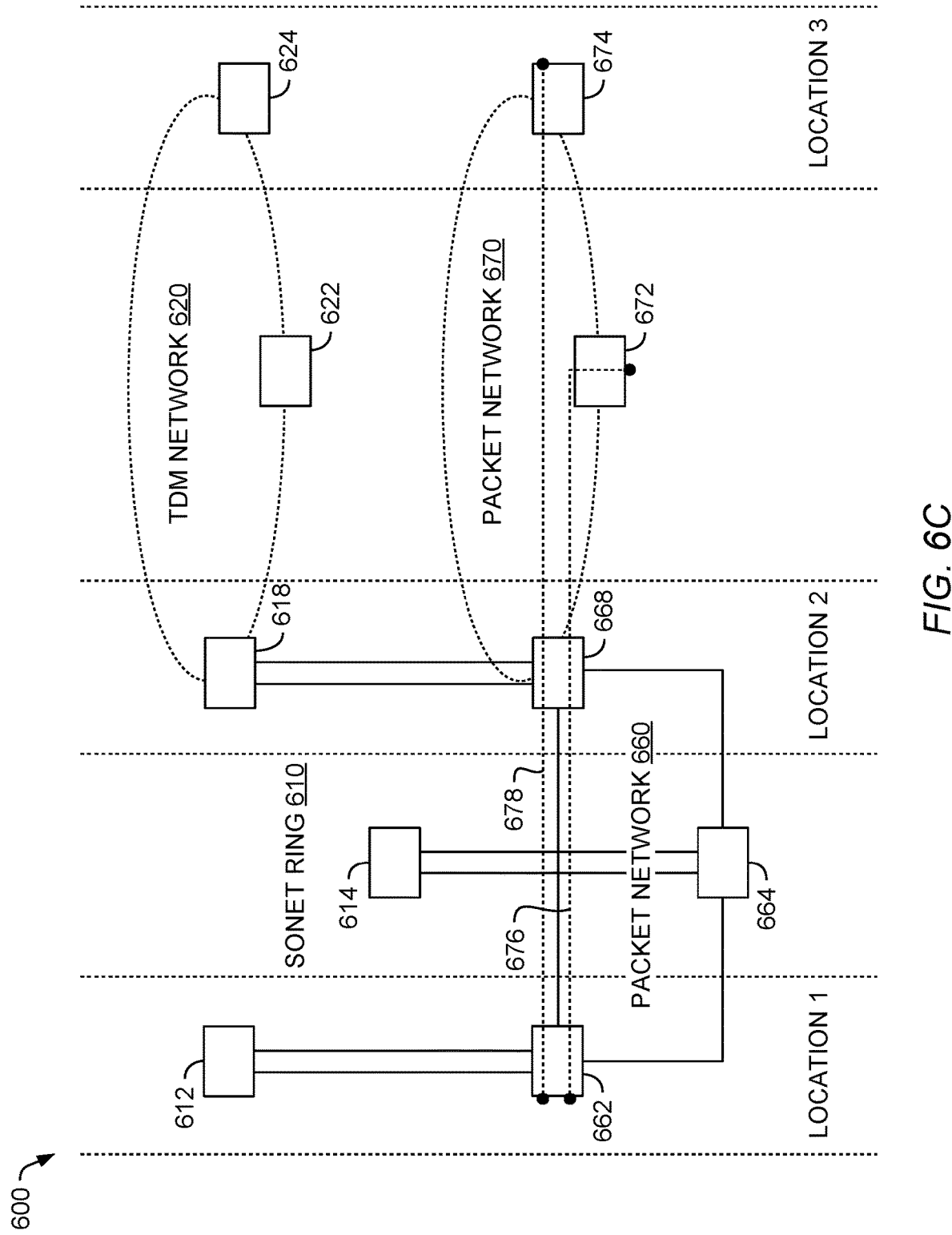

At block 508, during the second pass, the network administrator migrates this second TDM circuit. As illustrated in FIG. 6B, the partially migrated network includes a path 626 from the SONET node 612 to the TDM circuit 622. The circuit emulation controller migrates this path to the packet network. As illustrated in FIG. 6C, new path 676 carries traffic from the packet node 662 to the emulated TDM circuit 672. This new path 676 in FIG. 6C replaces the legacy path 626 in FIG. 6B. This migration can be done using the techniques described above for migrating the path 628 to the path 678.

Figure 6D:
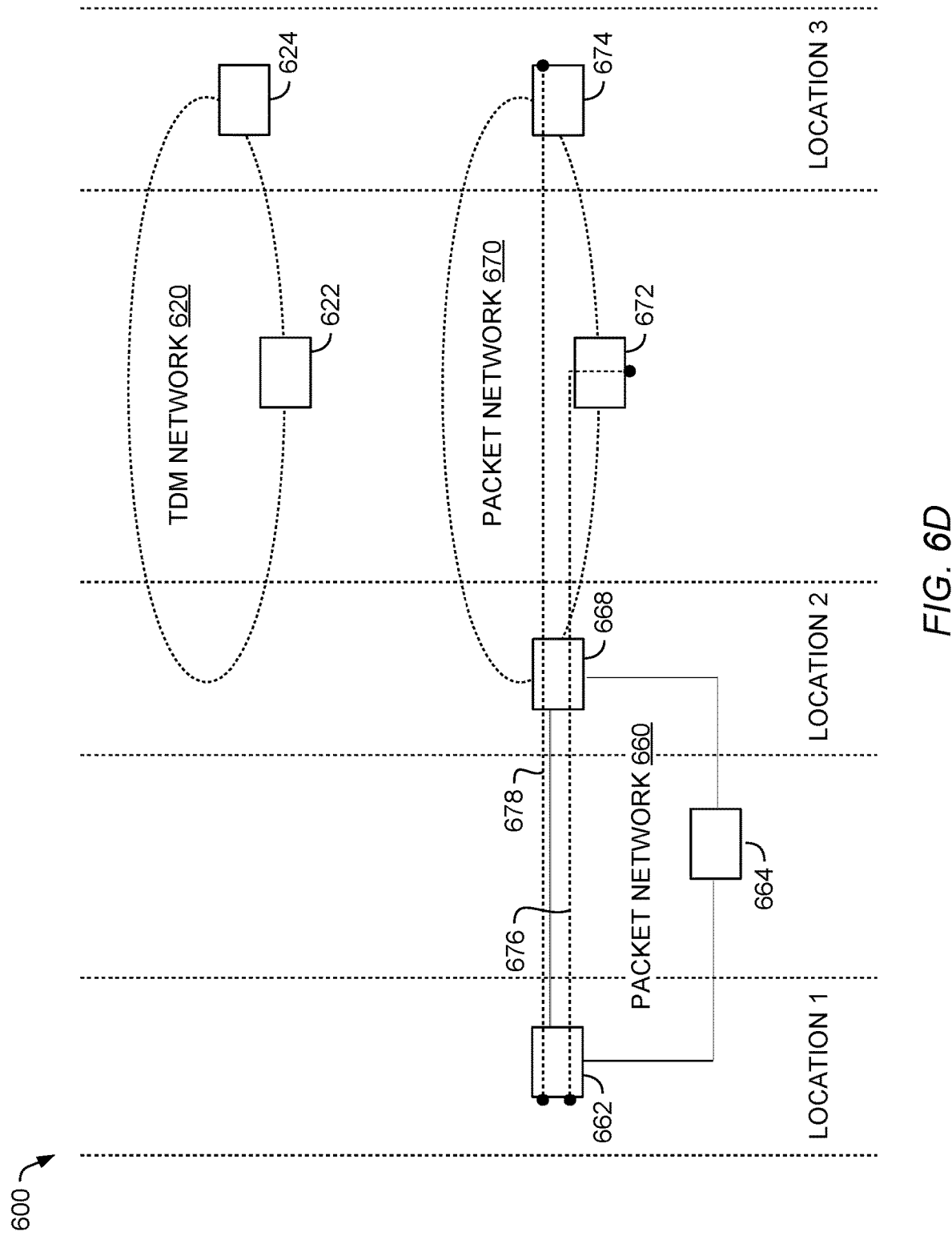

At block 510, the network administrator again determines whether all TDM circuits have been migrated. In the network illustrated in FIG. 6C, they have, and so the flow proceeds to block 512. At block 512, the network administrator finalizes the migration. In an embodiment, the remaining circuit emulation for the SONET ring (e.g., the connections in the packet network 660 emulating the SONET ring 610) is removed. Further, the SONET ring is decommissioned, because all traffic now flows through the packet network. This is illustrated in FIG. 6D, in which the SONET ring 610 has been decommissioned and the TDM circuits 622 and 624 have been replaced with the emulated TDM circuits 672 and 674.

One or more of the techniques disclosed above have many advantages over current solutions. As one example, in at least some embodiments the control plane remains in place throughout migration of a SONET network to a packet network, because the TOH is transparent and emulated by the packet network during migration. As another example, in at least some embodiments each TDM circuit can be migrated individually, without migrating the complete legacy network. A network administrator can wait days, weeks, months, or even years, between migrating different TDM circuits. This is because the circuit emulation includes transparent TOH data, in addition to the user data, keeping the network fully functional during migration.

Further, a network administrator might choose to migrate only a portion of the legacy TDM network. The network administrator can migrate any subset of the TDM circuits to packet connections, while leaving the remaining TDM circuits in place. This allows for both packet-switched and SONET TDM connections over the network, simultaneously. As another example, at least some of the techniques disclosed herein maintain the SONET topology during migration. This allows networks that make use of this topology for routing to seamlessly continue, without interruption. For example, a network that relies on network topology for routing will be able to continue routing, while part of the network is emulated using packet a packet switched network.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the circuit emulation module 220) or related data available in the cloud. For example, the circuit emulation module 220 could execute on a computing system in the cloud and facilitate emulation of the TDM network by the packet network. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for emulating a time division multiplexed (TDM) circuit using a packet switched network, comprising:
    installing a first packet node and a second packet node in a communication network comprising a first TDM node and a second TDM node, the first TDM node and the second TDM node forming a first span in the TDM circuit, the first span configured to transport a TDM data transmission, the TDM data transmission comprising user data transmitted in user data paths and transport overhead data;
    disconnecting a first fiber connection from the first TDM node and connecting the first fiber connection to the first packet node;
    disconnecting a second fiber connection from the second TDM node and connecting the second fiber connection to the second packet node; and
    emulating a selected portion of the user data paths using a packet connection formed by the first packet node and the second packet node, comprising:
        identifying a frame in the TDM transmission, the frame comprising: (i) an envelope comprising the user data transmitted in user data paths and (ii) the transport overhead data;
        selecting the portion of the user data paths for emulation, comprising:
            selecting one or more user data paths, from among the user data paths in the envelope, based on determining that the selected portion of user data paths is used to carry user data; and
        transmitting only a portion of the data in the TDM frame using the packet connection, comprising:
            transmitting the user data included in the selected portion of the user data paths, and the transport overhead data, using the packet connection, wherein the unselected user data paths are not transmitted.

2. The method of claim 1, wherein emulating the selected portion of the user data paths using the packet connection further comprises configuring the packet connection to:
    select a transport overhead byte from the frame in the TDM data transmission;
    include the transport overhead byte in a packet of the packet connection;
    transmit the packet over the packet connection;
    receive the packet over the packet connection;
    extract the transport overhead byte from the received packet; and
    forward the transport overhead byte across the TDM circuit.

3. The method of claim 2, wherein the packet connection comprises a multiprotocol label switching (MPLS) connection, wherein the transport overhead byte is carried in an MPLS packet, and wherein a sequence number related to the transport overhead byte is added to the MPLS packet.

4. The method of claim 1, wherein the TDM circuit comprises at least one of a synchronous optical networking (SONET) or a synchronous digital hierarchy (SDH) circuit.

5. The method of claim 1, wherein the packet connection comprises a circuit emulation over packet (CEP) connection.

6. The method of claim 1, further comprising:
    installing a third packet node and a fourth packet node in the communication network, wherein the communication network further comprises a third TDM node and a fourth TDM node forming a second span in the TDM circuit;
    disconnecting a third fiber connection from the third TDM node and connecting the third fiber connection to the third packet node;
    disconnecting a fourth fiber connection from the fourth TDM node and connecting the fourth fiber connection to the fourth packet node; and
    emulating a portion of a second TDM data transmission across the second span using a second packet connection, wherein the second TDM data transmission comprises second transport overhead data, and wherein the second packet connection emulates the second transport overhead data.

7. The method of claim 6, wherein the first span in the TDM circuit comprises a first span of a SONET or SDH ring and the second span in the TDM circuit comprises a second span of the SONET or SDH ring, the method further comprising:
    determining that all spans in the ring have been emulated using at least one packet connection, and in response emulating TDM data transmission across a third span using a third packet connection, wherein the third span is outside of the SONET or SDH ring.

8. The method of claim 1, wherein:
    the TDM circuit comprises a second span,
    data transmission across the second span uses TDM, and
    data transmission across the first span is emulated using the packet connection without using TDM.

9. The method of claim 1, wherein the user data paths comprise a plurality of virtual tributaries (VTs) and the selected portion of the user data paths comprises a first one or more VTs of the plurality of VTs.

10. A system comprising:
    a first packet node and a second packet node communicatively coupled to form a packet connection in a packet switched network;
    a first time division multiplexed (TDM) node and a second TDM node communicatively coupled to form a first span in a TDM circuit, the first span configured to transport a TDM data transmission, the TDM data transmission comprising user data transmitted in user data paths and transport overhead data; and a third TDM node and a fourth TDM node communicatively coupled to form a second span in the TDM circuit, wherein the packet connection is configured to emulate a selected portion of the user data paths, the emulating comprising:

identifying a frame in the TDM transmission, the frame comprising: (i) an envelope comprising the user data transmitted in user data paths and (ii) the transport overhead data;

selecting the portion of the user data paths for emulation, comprising:

selecting one or more user data paths, from among the user data paths in the envelope, based on determining that the selected portion of user data paths is used to carry user data; and transmitting only a portion of the data in the TDM frame using the packet connection, comprising:

transmitting the user data included in the selected portion of the user data paths, and the transport overhead data, using the packet connection, wherein the unselected user data paths are not transmitted, and the second span is configured to transmit data using TDM while the packet connection is configured to transmit the selected portion of the user data paths and the transport overhead data across the first span.

11. The system of claim 10, wherein the packet connection is configured to emulate the selected portion of the user data paths by:

selecting a transport overhead byte from the frame in the TDM data transmission;

including the transport overhead byte in a packet of the packet connection;

transmitting the packet over the packet connection;

receiving the packet over the packet connection;

extracting the transport overhead byte from the received packet; and forwarding the transport overhead byte across the TDM circuit.

12. The system of claim 11, wherein the packet connection comprises a multiprotocol label switching (MPLS) connection, wherein the transport overhead byte is carried in an MPLS packet, and wherein a sequence number related to the transport overhead byte is added to the MPLS packet.

13. The system of claim 10, wherein the first span in the TDM circuit comprises a first span of a synchronous optical networking (SONET) or a synchronous digital hierarchy (SDH) ring and the second span in the TDM circuit comprises a second span of the SONET or SDH ring.

14. A packet node in a communication network, comprising:

a network connection that communicatively couples the packet node to a second packet node and forms a packet connection in the communication network, wherein the communication network further comprises:

a first time division multiplexed (TDM) node and a second TDM node communicatively coupled to form a first span in a TDM circuit, the first span configured to transport a TDM data transmission, the TDM data transmission comprising user data transmitted in user data paths and transport overhead data; and a third TDM node and a fourth TDM node communicatively coupled to form a second span in the TDM circuit, and wherein the packet connection is configured to emulate a selected portion of the user data paths, the emulating comprising:

identifying a frame in the TDM transmission, the frame comprising: (i) an envelope comprising the user data transmitted in user data paths and (ii) the transport overhead data;

selecting the portion of the user data paths for emulation, comprising:

selecting one or more user data paths, from among the user data paths in the envelope, based on determining that the selected portion of user data paths is used to carry user data; and transmitting only a portion of the data in the TDM frame using the packet connection, comprising:

transmitting the user data included in the selected portion of the user data paths, and the transport overhead data, using the packet connection, wherein the unselected user data paths are not transmitted, and the second span in the TDM circuit is operable to transport data using TDM while the packet connection is configured to transmit the selected portion of the user data paths and the transport overhead data across the first span.

15. The packet node of claim 14, wherein the packet node is configured to emulate the selected portion of the user data paths by:

selecting a transport overhead byte from the frame in the TDM data transmission;

including the transport overhead byte in a first packet of the packet connection;

transmitting the first packet over the packet connection;

receiving a second packet over the packet connection;

extracting the transport overhead byte from the received second packet; and forwarding the transport overhead byte across the TDM circuit.

16. The packet node of claim 15, wherein the second packet is received from the second packet node and wherein extracting the transport overhead byte from the received second packet comprises storing the received second packet in a de-jitter buffer.

17. The packet node of claim 14, wherein the packet connection comprises a circuit emulation over packet (CEP) connection.

18. The packet node of claim 14, wherein the first span in the TDM circuit comprises a first span of a synchronous optical networking (SONET) or a synchronous digital hierarchy (SDH) ring and the second span in the TDM circuit comprises a second span of the SONET or SDH ring.

* * * * *